US010389418B2

(12) United States Patent
Kakishima et al.

(10) Patent No.: US 10,389,418 B2
(45) Date of Patent: Aug. 20, 2019

(54) BEAM SELECTING METHOD, BASE STATION, AND USER EQUIPMENT

(71) Applicant: NTT DOCOMO, INC., Tokyo (JP)

(72) Inventors: Yuichi Kakishima, Tokyo (JP); Satoshi Nagata, Tokyo (JP); Yoshihisa Kishiyama, Tokyo (JP); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/821,283

(22) Filed: Nov. 22, 2017

(65) Prior Publication Data

US 2018/0097552 A1 Apr. 5, 2018

Related U.S. Application Data

(63) Continuation of application No. 15/126,162, filed as application No. PCT/JP2014/081418 on Nov. 27, 2014, now abandoned.

(30) Foreign Application Priority Data

Mar. 20, 2014 (JP) .................................. 2014-059181

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0617* (2013.01); *H04B 7/0619* (2013.01);
(Continued)

(58) Field of Classification Search
CPC .. H04B 7/0617; H04B 7/0417; H04B 7/0469; H04B 7/0408; H04B 7/0456;
(Continued)

(56) References Cited

U.S. PATENT DOCUMENTS 9,184,806 B2  11/2015  Kim et al.
9,236,916 B2   1/2016  Wernersson et al.
(Continued)

FOREIGN PATENT DOCUMENTS

WO   2013133645 A1   9/2013
WO   2013157790 A1   10/2013
WO   2014/038321 A1   3/2014

OTHER PUBLICATIONS

International Search Report issued in corresponding application No. PCT/JP2014/081418 dated Feb. 10, 2015 (4 pages).
(Continued)

*Primary Examiner* — Rahel Guarino
(74) *Attorney, Agent, or Firm* — Osha Liang LLP

(57) ABSTRACT

A user equipment used in a mobile communication system that has multiple antenna ports configured to receive a first reference signal from a base station is disclosed. The antenna ports are configured to transmit the first feedback information for the first reference signal. Additionally, the antenna ports are configured to receive a second reference signal from the base station and transmit the second feedback information for the second reference signal.

1 Claim, 13 Drawing Sheets

(51) Int. Cl.
*H04B 7/10* (2017.01)
*H04B 7/06* (2006.01)
*H04W 16/28* (2009.01)

(52) U.S. Cl.
CPC ......... *H04B 7/0626* (2013.01); *H04B 7/0684* (2013.01); *H04B 7/0695* (2013.01); *H04B 7/0697* (2013.01); *H04B 7/10* (2013.01); H04W 16/28 (2013.01)

(58) Field of Classification Search
CPC .. H04B 7/0619; H04B 7/0626; H04B 7/0684; H04B 7/0695; H04B 7/0697; H04B 7/10; H04L 5/0048; H04L 25/0226; H04W 52/245; H04W 16/28; H01Q 21/061
See application file for complete search history.

(56) References Cited

U.S. PATENT DOCUMENTS

| | | | | |
|---|---|---|---|---|
| 9,825,682 | B2* | 11/2017 | Park | H04B 7/0626 |
| 9,871,639 | B2* | 1/2018 | Lee | H04L 5/0057 |
| 2013/0028182 | A1* | 1/2013 | Geirhofer | H04B 7/0626 |
| | | | | 370/328 |
| 2013/0223271 | A1 | 8/2013 | Huang et al. | |
| 2013/0242773 | A1 | 9/2013 | Wernersson et al. | |
| 2013/0308715 | A1* | 11/2013 | Nam | H04B 7/0469 |
| | | | | 375/267 |
| 2014/0079149 | A1* | 3/2014 | Lee | H04B 7/0417 |
| | | | | 375/267 |
| 2014/0133336 | A1 | 5/2014 | Park et al. | |
| 2015/0049824 | A1 | 2/2015 | Kim et al. | |
| 2015/0092875 | A1 | 4/2015 | Kim et al. | |
| 2015/0222340 | A1 | 8/2015 | Nagata et al. | |
| 2016/0191273 | A1 | 6/2016 | Nagata et al. | |

OTHER PUBLICATIONS

Written Opinion of the International Searching Authority issued in corresponding application No. PCT/JP2014/081418 dated Feb. 10, 2015 (3 pages).

3GPP TSG RAN #58, RP-121994, "Study on Downlink Enhancements for Elevation Beamforming for LTE"; (6 pages).

Samsung, "New SID Proposal: Study on Full Dimension MIMO for LTE"; 3GPP TSG RAN Meeting #58, RP-121804; Barcelona, Spain; Dec. 4-7, 2012 (7 pages).

Office Action issued in the counterpart Chinese Patent Application No. 201480077092.1, dated Nov. 23, 2017 (15 pages).

Office Action issued in corresponding Japanese Patent Application No. 2017-225051, dated Sep. 25, 2018 (7 pages).

Alcatel-Lucent Shanghai Bell et al., "Considerations on CSI feedback enhancements for high-priority antenna configurations", 3GPP TSG-RAN WG1 #66, R1-112420, Athens, Greece, Aug. 22-26, 2011 (7 pages).

Office Action issued in the counterpart Japanese Patent Application No: 2017225051, dated May 14, 2019 (6 pages).

* cited by examiner

STEP 2-A

WIDE BEAM SELECTION

STEP 2-B

NARROW BEAM SELECTION

| 000 | Beam 1 | 100 | Beam 2A |
|-----|--------|-----|---------|
| 001 | Beam 2 | 101 | Beam 2B |
| 010 | Beam 3 | 110 | Beam 2C |
| 011 | Beam 4 | 111 | Beam 2D |

21

| 000 | None of below |
|-----|---------------|
| 100 | Beam 2A |
| 101 | Beam 2B |
| 110 | Beam 2C |
| 111 | Beam 2D |

22

| 000 | Beam 1A-1D | 100 | Beam 2A |
|-----|------------|-----|---------|
| 001 | Reserved   | 101 | Beam 2B |
| 010 | Beam 3A-3D | 110 | Beam 2C |
| 011 | Beam 4A-4D | 111 | Beam 2D |

| 24 | | | |
|---|---|---|---|
| 24A | | 24B | |
| 00 | Beam 1 | 00 | Beam A |
| 01 | Beam 2 | 01 | Beam B |
| 10 | Beam 3 | 10 | Beam C |
| 11 | Beam 4 | 11 | Beam D |

BEAM SELECTING METHOD, BASE STATION, AND USER EQUIPMENT

CROSS REFERENCE TO RELATED APPLICATION

This is a continuation application of U.S. patent application Ser. No. 15/126,162 filed Sep. 14, 2016, which is a national stage application of PCT/JP2014/081418, which claims priority to Japanese Patent Application No. 2014-059181. The contents of these applications are hereby incorporated by reference in their entirety.

TECHNICAL FIELD

The present invention relates to the field of mobile telecommunications, and more particularly, to a technique of beam selection for three-dimensional multiple input multiple output (3D-MIMO) mobile telecommunication systems.

BACKGROUND

Technical Specification Releases 8 to 11 of the Third Generation Partnership Project (3GPP) for standardization of mobile technologies adapt horizontal beam forming using multiple antenna ports provided in a lateral direction at a base station.

In 3GPP Release 12, 3D-MIMO for achieving vertical beam forming, in addition to the horizontal beam forming, has been discussed. See, for example, Non-patent Documents 1 and 2 listed below. By forming a beam in a vertical (or elevation) direction and a horizontal (or azimuth) direction, system characteristics are expected to be improved.

In 3GPP standardization, 3D-MIMO scheme using eight or less transmission antenna ports is called "elevation beamforming" and 3D-MIMO with antenna ports greater than eight is called full-dimensional (FD) MIMO. Apart from the standardization, FD-MIMO is named a massive-MIMO and the antenna layout is not limited to two-dimensional or three-dimensional layout.

FD-MIMO is a technique capable of greatly improving the efficiency of frequency use by using a large number of antenna ports or antenna elements at a base station to form a sharp (directional) beam. By providing a number of antenna ports to a base station, beam forming in horizontal and vertical directions is achieved, just like elevation beamforming.

LIST OF RELATED DOCUMENTS

Non-Patent Document 1: 3GPP TSG RAN#58, RP-121994, "Study on Downlink Enhancement for Elevation Beamforming for LTE"
Non-Patent Document 2: 3GPP TSG RAN#58, RP-122015, "New SID Proposal: Study on Full Dimension for LTE"

SUMMARY

With FD-MIMO or massive-MIMO, the beam gain can be increased by precoding, but the beam width becomes narrow. FIG. 1A through FIG. 1C illustrate beam patterns formed by one-dimensional array antennas with discrete Fourier transform (DFT) precoding applied. FIG. 1A is a beam pattern (with 8 DFT beams) formed by four antennas, FIG. 1B is a beam pattern (with 16 DFT beams) formed by eight antennas, and FIG. 1C is a beam pattern (with 32 DFT beams) formed by sixteen antennas.

To cover every direction, beam directions whose number is proportional to (e.g., twice) the number of antenna ports or elements are used. As the beam gain increases with the increased number of antennas, the width of each beam becomes narrower. When using a massive antenna array with sixteen or more antennas, it is desired for a base station to form many beams or beam candidates and select the optimum beams. To carry out beam selection involving other cells or other sectors, the number of beams is likely to increase to several times or dozens of times.

For the optimum beam selection, one of conceivable approaches is to allow user equipment to select the best beam from among as many beam candidates as possible. However, the greater the number of beam candidates, the more the precoded reference signals such as channel state information reference signals (CSI-RSs) are to be transmitted and the reference signal overhead increases.

It is desired to provide a technique for efficient beam transmission and beam selection, while preventing overhead from increasing due to excessive traffic of reference signals and feedback information.

To solve the above-described technical problem, a novel beam selecting method is provided for a mobile communication system that includes a base station with multiple antennas and a user equipment conducting radio communication with the base station. The beam selecting method includes the steps of at the base station, detecting a direction in which the user equipment is located;

transmitting precoded reference signals toward the detected direction by spatial multiplexing, using same frequency and time resources; and determining a beam for the user equipment based upon feedback information from the user equipment.

In a mobile communication system using a 3D-MIMO scheme, efficient beam transmission and beam selection can be achieved, while preventing reference signal overhead from increasing.

DETAILED DESCRIPTION

Figure 1A:
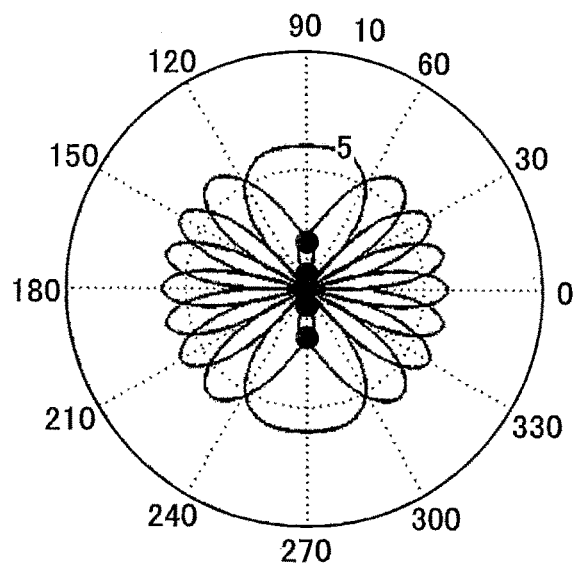
FIG. 1A illustrates a directional beam pattern in accordance with the number of antennas.
Figure 1B:
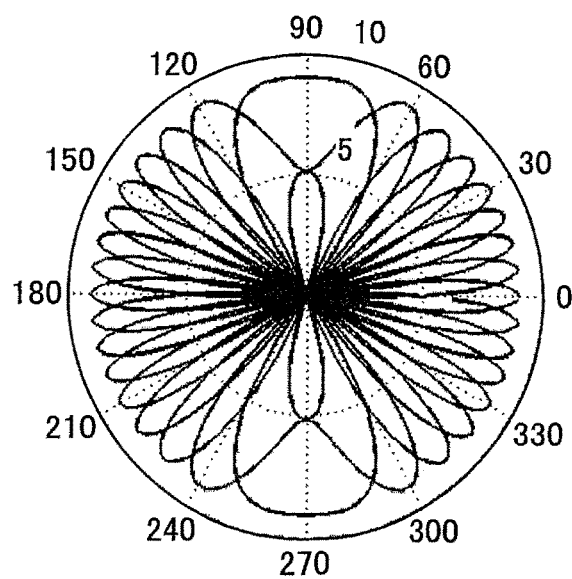
FIG. 1B illustrates a directional beam pattern in accordance with the number of antennas.
Figure 1C:
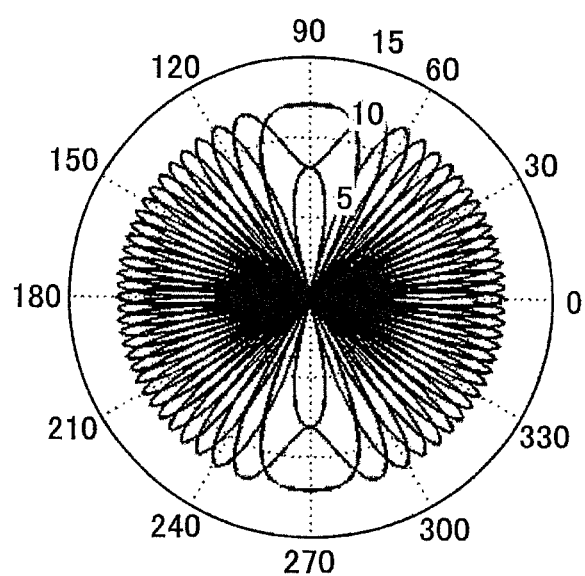
FIG. 1C illustrates a directional beam pattern in accordance with the number of antennas.
Figure 2:
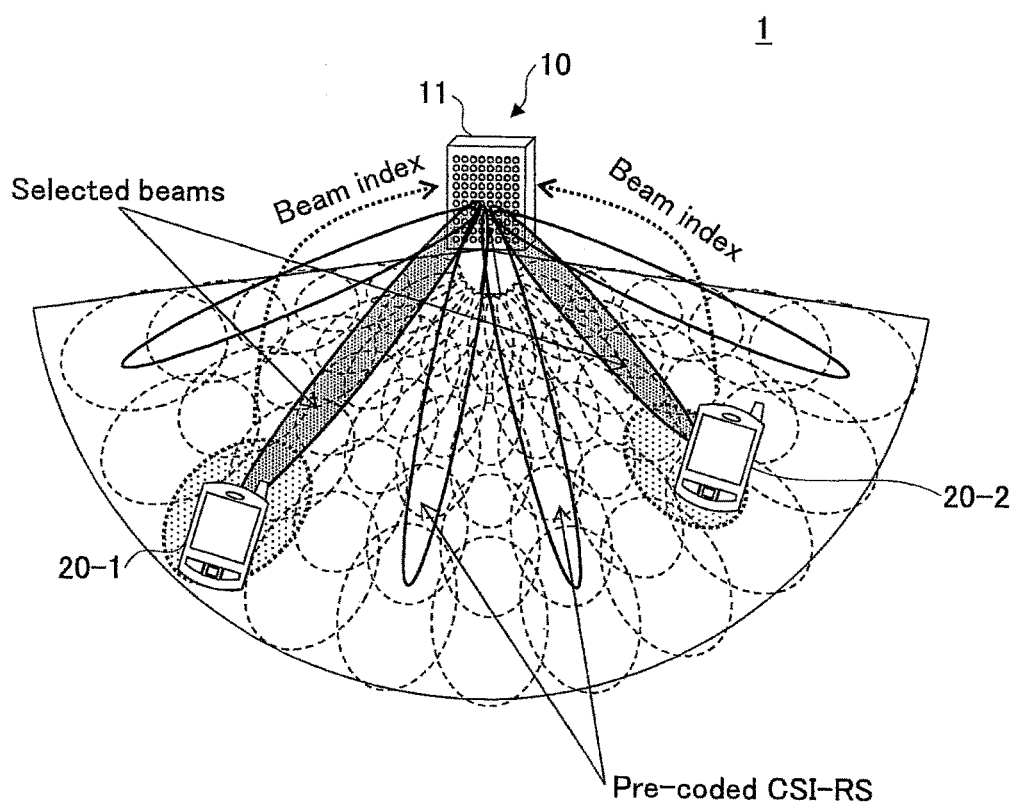
FIG. 2 illustrates a basic concept of a mobile communication system of the embodiment.

FIG. 2 illustrates a basic concept of a mobile communication system 1 according to the embodiment. The base station 10 simultaneously transmits two or more precoded (namely, directional) reference signals from an antenna array 11 with multiple antenna elements. The referenced signal is, for example, a precoded channel state information reference signal (precoded CSI-RS).

User equipments UE 20-1 and 20-1 select appropriate beams from among the precoded reference signals and feed the selection results back to the base station 10. Appropriate beams can be determined at each of the user equipments 20-1 and 20-2 based upon signal to interference-plus-noise ratio (SINR), reference signal received power (RSRP), reference signal received quality (RSRQ), etc.

In realizing the system illustrated in FIG. 2, overhead may increase due to the increased number of precoded reference signals. To avoid the overhead increasing, a step-by-step beam selection is proposed in the embodiment. With the step-by-step beam selection, areas in or around which the respective user equipments 20-1 and 20-2 are located are specified. Then, precoded reference signals are transmitted over candidate beams toward the specified areas to allow each of the user equipments 20-1 and 20-2 (which may be referred to collectively as "user equipment 20") to select an appropriate beam from the finite number of candidate beams.

Depending on the contents of the feedback information from the user equipment (abbreviated as "UE") 20, the base station 10 may immediately select the beam based upon the feedback information, or determine a beam for the user equipment 20 after further narrowing down the beam direction. Alternatively, the earlier step(s) such as retransmission of reference signals toward the detected area and/or detection of the UE location may be repeated.

When the optimum beam for the user equipment 20 is determined, beam tracking may be performed to let the beam direction, namely, data transmission direction follow the user equipment 20.

Figure 3:
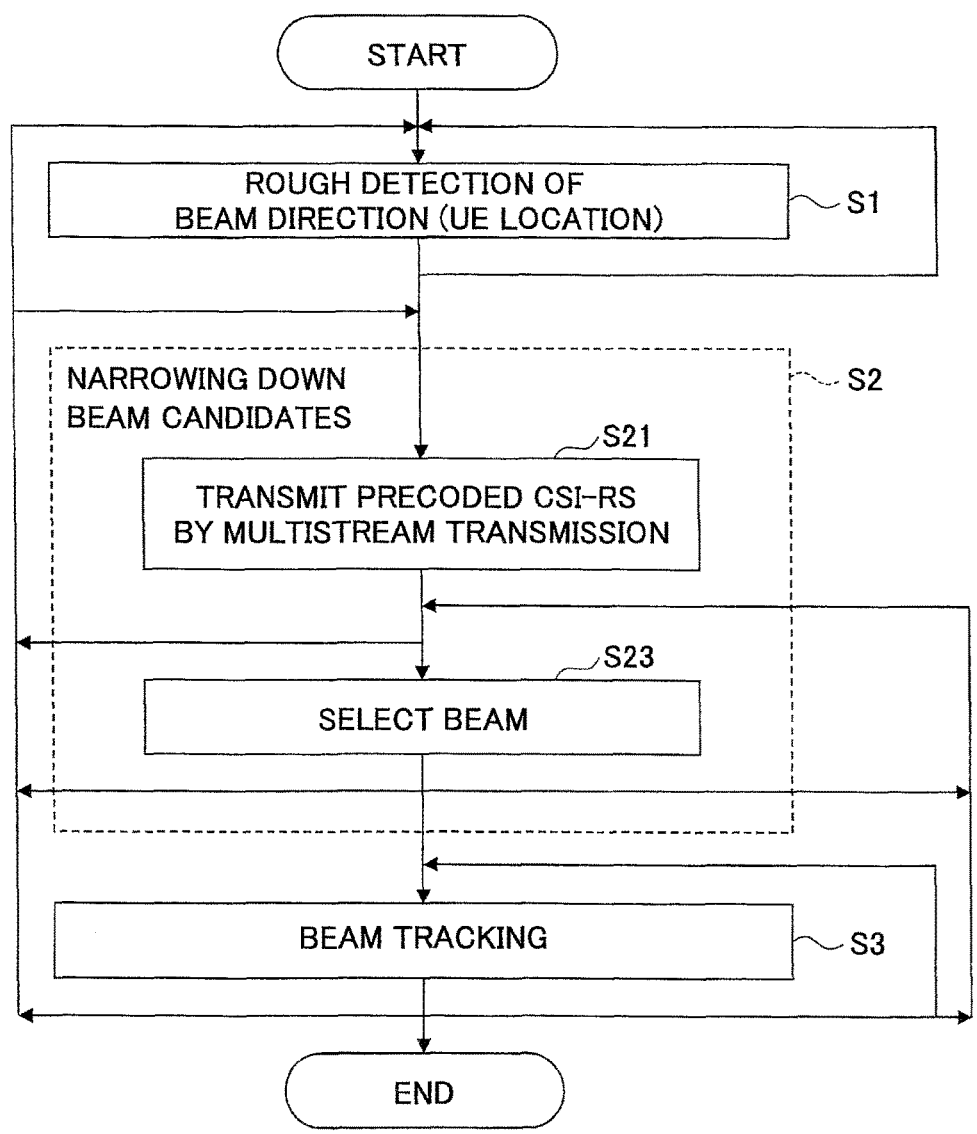
FIG. 3 illustrates a step-by-step approach for beam selection carried out in the embodiment.

FIG. 3 is a diagram illustrating a step-by-step approach to reduce the quantity or traffic of the reference signals and feedback information. First, the base station 10 detects an approximate location of the user equipment 20, namely, an approximate direction of beam (S1). This step is a "rough detection" step.

When the base station 10 illustrated in FIG. 2 is a small base station or a remote base station, rough detection may be performed under the assist of a macro base station or based upon mutual relationship with neighboring base stations. The base station 10 may perform rough detection by itself based upon synchronization signals, positioning reference signals (PRSs), global positioning system (GPS) information, etc. The rough detection step (S1) may be repeated at prescribed time intervals or based upon information from the user equipment 20.

When the approximate location of the user equipment 20 is determined, the base station 10 narrows down the beam candidates (S2). In the beam candidate narrow down step (S2), precoded reference signals (such as precoded CSI-RSs) are transmitted simultaneously over multiple streams toward the roughly detected direction (S21). Then, the base station 10 selects the optimum beam based upon feedback information from the user equipment 20 (S23). Transmission of reference signals (S21) and/or beam selection (S23) may be repeated at prescribed intervals or based upon the feedback information from the user equipment 20. Depending on the contents of the feedback information, rough detection (S1) and/or beam candidates narrow down (S2) may be recommenced after the step S21 or S23.

When a beam is selected for the user equipment 20, beam tracking may be performed (S3) to let the selected beam follow the user equipment 20. If the beam deviates from or cannot follow the user equipment 20 during the beam tracking, rough detection (S1) and/or beam candidates narrow down (S2) may be recommenced.

Although in this example steps S1 to S3 are performed on a step-by-step basis, one or two of the steps S1-S3 may be selected to carry out less complicated beam selection. A part or all of the steps S1-S3 may be combined with other beam selection techniques.

Actual examples of the beam candidates narrow down step (S2) are described in more detail below.

<Beam Selection Scheme 1>

Figure 4:
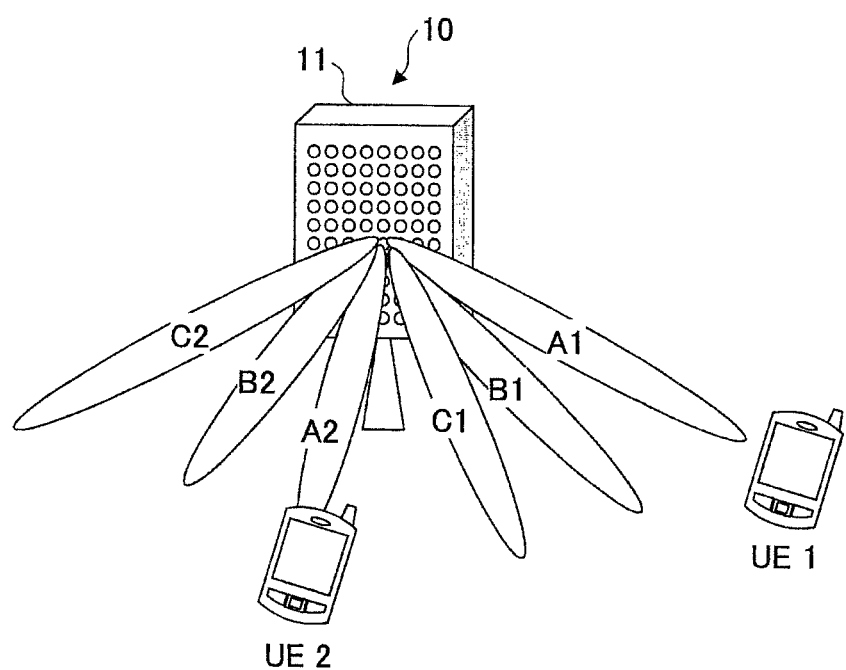
FIG. 4 illustrates a first example of beam selection.

FIG. 4 illustrates the first example of beam candidates narrow down. In this example, the base station 10 transmits precoded reference signals for channel measurement (e.g., precoded CSI-RSs) by multiple streams using the same frequency and/or time resources, applying spatial multiplexing, thereby preventing overhead from increasing.

The base station 10 spatially multiplexes and transmits beams (i.e., signal streams) A1 and A2 at timing A, and spatially multiplexes and transmits beams (i.e., signal streams) B1 and B2 at timing B. A set of beams is spatially multiplexed and transmitted in the same manner at subsequent timings.

When user equipment (UE) 1 selects beam A1 and UE 2 selects beam A2, then the base station 10 may apply multi-user MIMO (MU-MIMO) by pairing UE 1 and UE 2. By transmitting multiple precoded reference signals at the same time using different beams (or signal streams), a user pair can be determined simultaneously with beam selection, taking inter-user interference into account.

In FIG. 4, precoded CSI-RSs denoted by different alphabetical symbols are multiplexed along a time axis. Any type of precoded reference signals may be multiplexed in a frequency-division or code-division manner. The number of signal streams simultaneously transmitted is not limited to two, but three or more signal streams may be spatially multiplexed.

Because in this method two or more precoded CSI-RSs are transmitted at once, TS overhead can be reduced.

By transmitting precoded CSI-RSs on multi-streams, received signal qualities can be measured taking inter-user interference into account.

By orthogonalizing candidate beams of precoded CSI-RSs (e.g., A1 and A2) transmitted by multi-streams from the base station 10, MU-MIMO with reduced inter-UE interference can be applied.

When multi-stream transmission is employed in the scheme of FIG. 4, the base station 10 provides signal sequences, multiplexed positions (on time and/or frequency axes), orthogonal codes, etc. to UEs as signaling information.

<Beam Selection Scheme 2>

Figure 5A:
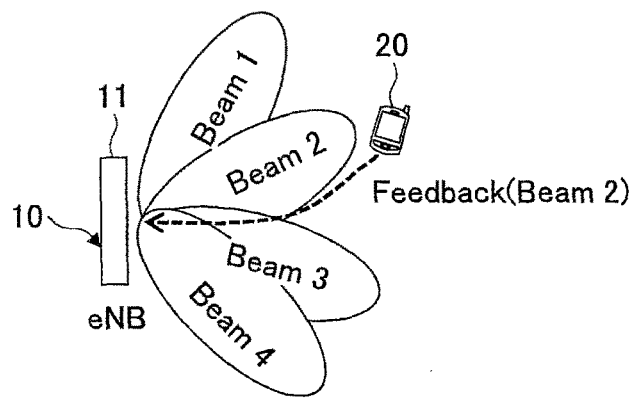
FIG. 5A illustrates a second example of beam selection.
Figure 5B:
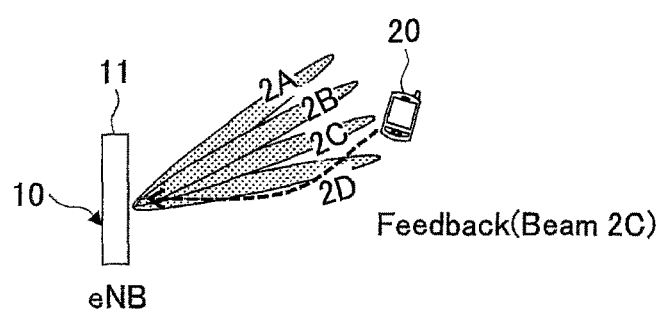
FIG. 5B illustrates a second example of beam selection.

FIG. 5A and FIG. 5B illustrate examples of beam candidates narrow down. With the beam selection scheme 2, beam candidates narrow down is performed on a step-by-step basis.

FIG. 5A illustrates a first half step 2-A of beam candidates narrow down. In this step, the base station 10 transmits two or more precoded CSI-RSs from the antenna array 11 with relatively wide beams (Beam 1, Beam 2, Beam 3 and Beam 4 in the figure). The reference signals being transmitted may be of other types, such as cell-specific reference signals (CRSs). In the earlier stage of beams candidates narrow down, wide beams are used to reduce RS overhead, and simultaneously, the location of the user equipment 20 can be further narrowed.

The user equipment 20 selects the optimum beam (Beam 2 in this example) from the multiple wide beams and feeds the selection result back to the base station 10.

FIG. 5B illustrates a second half step 2-B of beam candidates narrow down. Based upon the feedback information acquired in the first half step 2-A, the base station 10 determines two or more precoded CSI-RSs to be transmitted toward the direction of Beam 2. The set of precoded CSI-RSs determined in this step are named second precoded CSI-RSs for the sake of convenience. The second precoded CSI-RSs may be transmitted by sharp and narrow beams, compared with the wide beam used in the first half step 2-A.

The second precoded CSI-RSs are, for example, UE-specific reference signals. By transmitting the second-half reference signals over a UE-specific channel, especially on a physical downlink shared channel (PDSCH), impact on legacy user equipment (UE) can be reduced.

The user equipment 20 then selects the optimum beam (Beam 2C in this example) from the second precoded CSI-RSs, and feeds the selection result back to the base station 10. With this method, beam candidates narrow down and selection of the optimum beam can be performed more finely and more precisely. The number of the optimum beam(s) fed back to the base station 10 is not limited to a single beam, but plural beam indexes may be fed back to the base station based upon the measurement levels and/or the channel qualities of the received reference signals.

With the exemplified scheme illustrated in FIG. 5A and FIG. 5B, beam selection of the second half step 2-B is carried out using the feedback information acquired in the first half step 2-A. However, feedback operations may be performed separately from each other between the first half step 2A and the second half step 2B. For example, one or more beams may be selected in the vertical or elevation direction in the first half step 2-A, and then one or more beams may be selected in the horizontal or azimuth direction in the second half step 2-B.

<Beam Selection Scheme 3>

Figures 6A, 6B, 6C:
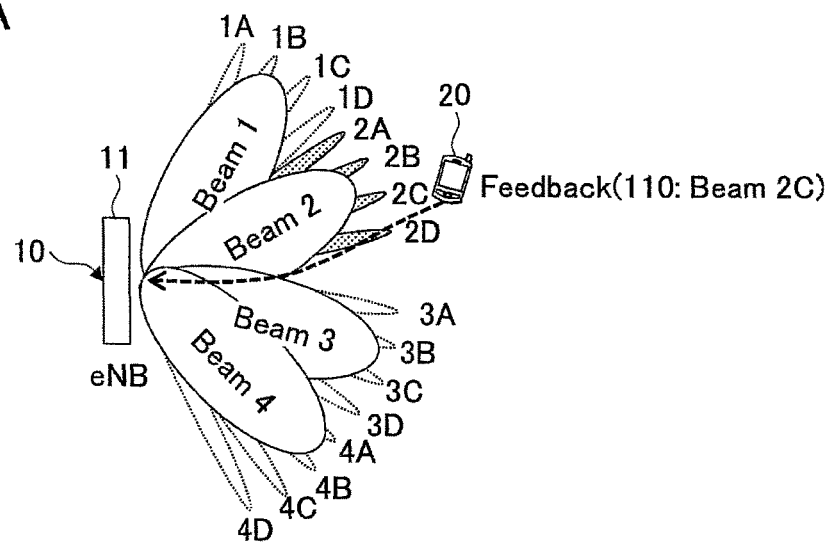
FIG. 6A illustrates a third example of beam selection.
FIG. 6B illustrates an example of a feedback table used in beam selection of FIG. 6A.
FIG. 6C illustrates another example of a feedback table used in beam selection.

FIG. 6A to FIG. 6C illustrates the third example of beam candidates narrow down. In the above-described beam selection scheme 2, the second half step 2-B may not be performed in some cases. For example, when the moving speed of the user equipment 20 is fast, it is difficult to accurately narrow down the beams candidates in the second half step 2-B because the location of the user equipment 20 is likely to change from that detected in the first half step 2-A. In this case, recommencing the first half step 2A or the previous step S1 is more efficient to narrow down the beam candidates.

For this reason, the beam selection scheme 3 provides a feedback method that accepts switch back to the previous step (e.g., the first half step 2-A).

FIG. 6A schematically illustrates beam patterns transmitted from the antenna array 11 of the base station 10, and FIG. 6B illustrates an example of a feedback table 21 shared between the base station 10 and the user equipment 20. The feedback table 21 of FIG. 6B represents a situation in which the latest information acquired in the first half step 2-A is "Beam 2".

With 3-bit feedback information, upon acquiring feedback information indicating "Beam 2" selected in the first half step, beam identification bits "100", "101", "110", and "111" are set up in the table for sharp and narrow beams to 2A to 2D, while maintaining beam identification information items "000", "001", "010", and "011" for wide beams (Beam 1 to Beam 4) used in the first half step.

When the feedback table 21 is in the FIG. 6B's state, the user equipment 20 can monitor 8 beams. Two types of beams, namely, wide beams used in the first half step 2-A and sharp narrow beams used in the second half step 2-B are included in a single feedback table 21. The base station 10 can switch between the beam types based mainly upon the activities of the user equipment 20 (under UE's initiative).

For example, when the user equipment 20 selects Beam 2C in the latter step after selection of Beam 2, the user equipment 20 supplies bit information "110" to the base station 10. The base station 10 sets up a precoding vector to form Beam 2C for the user equipment 20.

On the other hand, if the feedback information transmitted from the user equipment 20 is "000", "001", "010" or "011", then the base station 10 applies precoding without using narrow beams. This arrangement is advantageous for the user equipment 20 moving at a high speed to narrow down beam patterns.

In comparing between wide beams and narrow beams, an offset may be added. For example, the user equipment 20 may add an offset value (e.g., 3 dB) to the received power level when measuring wide beams "000", "001", "010", and "011". By adding an offset value, beam qualities can be compared in a fair condition.

FIG. 6C illustrates an example of feedback table 22 shared between the base station and the user equipment 20. Feedback table 22 exhibits the state in which Beam 2 has been selected in the former step 2-A. Feedback table 22 has a value "000" in addition to Beams 2A to 2D ("100", "101", "110", and "111") that subdivides the direction of Beam 2. The value "000" may be used to report beam deviation. When receiving feedback information "000" from the user equipment 20 in the latter half step, the base station 10 may recommence the first half step 2-A or return to rough detection in S1.

With this scheme, step-by-step operations for beam candidates narrow down can be performed based mainly upon the activities of the user equipment 20 (under UE's initiative).

<Beam Selection Scheme 4>

Figures 7A, 7B:
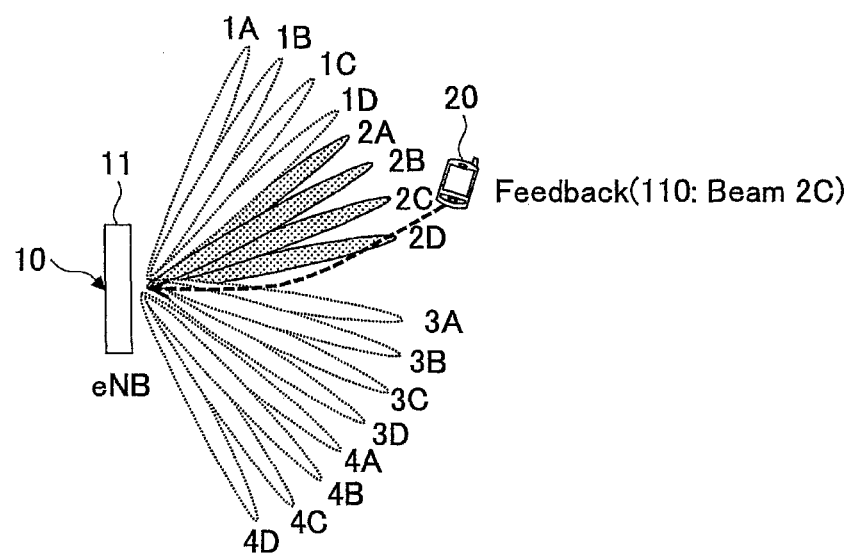
FIG. 7A illustrates a fourth example of beam selection.
FIG. 7B illustrates an example of a feedback table used in beam selection.

FIG. 7A and FIG. 7B illustrate the fourth example of beam candidates narrow down. With the beam selection scheme 3 described above, reference signals are transmitted at different beam widths to allow the step-by-step basis beam switching. The beam selection scheme 4 achieves the same advantageous effect as in the method of FIG. 6A to FIG. 6C without using wide beams.

In FIG. 7A and FIG. 7B, the base station 10 and the user equipment 20 have a feedback table 23 which information is shared and commonly used between the base station 10 and the user equipment 20. The feedback table 23 represents the latest state immediately after the selection of Beam 2 in the first half step 2-A.

The feedback table 23 has values "000" representing Beams 1A to 1D, "010" representing Beams 3A to 3D, and "011" representing Beams 4A to 4D, in addition to Beams 2A to 2D defined by subdividing the direction of Beam 2. Beams 2A to 2D are represented by values "100", "101", "110", and "111", respectively. An area for "001" may be a reserved area.

When the feedback information supplied from the user equipment 20 indicates a value "000", "010", or "011", the base station 10 goes back to the first half step 2-A. With this scheme, operations in the step-by-step basis beam candidates narrow down can be switched under the initiative of the user equipment 20, using 3-bit information.

<Beam Selection Scheme 5>

Figures 8A, 8B:
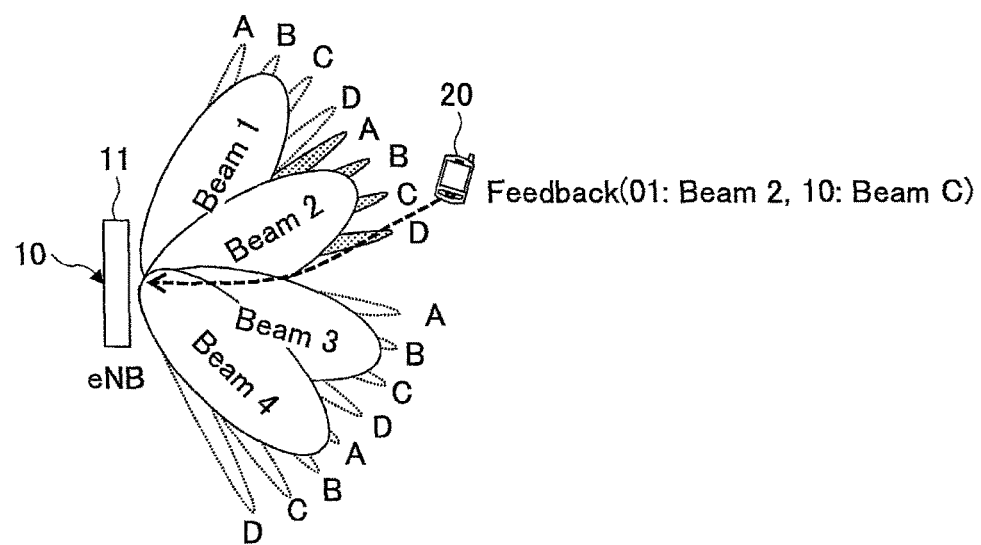
FIG. 8A illustrates a fifth example of beam selection.
FIG. 8B illustrates a feedback table used in beam selection.

FIG. 8A and FIG. 8B illustrate the fifth example of beam candidates narrow down. Although in the above-described beam selection schemes 3 and 4, operations are switched between the first half step 2-A and the second half step 2-B based mainly upon the activities of the user equipment 20, the base station 10 may control the step-by-step basis operations.

FIG. 8B illustrates a feedback table 24 shared between the base station 10 and the user equipment 20. The feedback table 24 has two areas 24A and 24B: the area 24A represents wide beams, Beam 1 to Beam 4 using two bits, and the area 24B represent subdivided beams, Beam A to Beam D using two bits. As illustrate in FIG. 8A, the base station 10 allows the user equipment 20 to feed back a wide beam index and a narrow beam index separately.

For example, by using different feedback periods between the wide beams and the narrow beams, beam selection result can be fed back independently from each other. By performing selection of a narrow beam more frequently, efficient feedback operations can be achieved.

The indexes of narrow beams may be in accordance with the feedback information of a wide beam. For example, when Beam 2 is selected in the first half step 2-A, the beam candidates narrow down in the second half step 2-B may be carried out among subdivided beams 2A to 2D.

The beam selection scheme 5 may be applied to step-by-step basis beam candidates narrow down using only narrow beams as in the beam selection scheme 4. In this case, for example, Beams 1A to 1D are included in a beam group and represented by 2-bit information.

Furthermore, the step-by-step basis operations may be switched without feedback from the user equipment or configuration at the base station 10. For example, when the channel quality indicator (QI) is out of the range (which means that the radio communication quality is unsatisfied), the operation may go back to rough detection of step S1, or the first half step 2A of beam candidates narrow down.

When the user equipment 20 transmits a random access channel (RACH) (e.g., when disconnected from the cell), the process may return to the rough detection (S1) or the first half step 2A of beam candidates narrow down.

<Beam Tracking>

Figure 9:
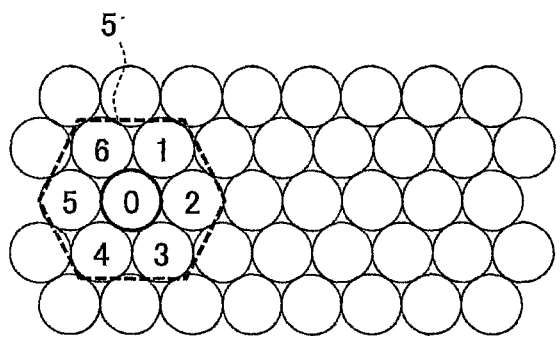
FIG. 9 is a diagram to explain beam tracking.
Figure 9:
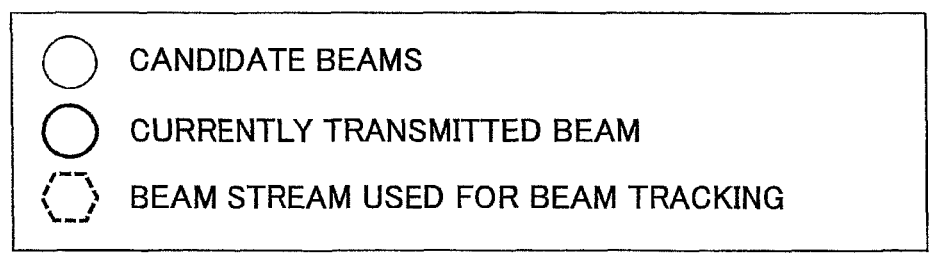

FIG. 9 is a diagram to explain beam tracking step (S3). FIG. 9 illustrates beam directions viewed from the antenna array 11 of the base station 10. The lateral direction of the figure is a horizontal or azimuth direction, and the top-to-bottom direction of the figure is a vertical or elevation direction.

The base station 10 transmits tracking reference signals using beams #1 to #6, in addition to a currently used beam #0 selected by the beam candidates narrow down step (S2). Beams #1 to #6 are candidate beams to be used when the currently used beam #0 cannot follow the user equipment 20. The current beam #0 for data transmission and the candidate beams #1 to #6 form a beam stream 51 for beam tracking.

Upon receiving the beam stream 51, the user equipment 20 measures the received strength or other parameters of each beam and reports one or more beam indexes with satisfactory qualities to the base station 10. The optimum beam index or the highest X beam indexes may be reported. Alternatively, all the measurement results of beams #0 to #6 may be reported. In this case, the measurement results may be fed back ordered from the highest quality to the lowest or from the lowest quality to the highest.

Based upon the feedback information about beam tracking, the base station 10 selects and sets the optimum beam as the current beam #0 for the user equipment 20, thereby letting the data transmission direction follow the user equipment 20.

When beam tracking is deviated due to, for example, the fast moving speed of the user equipment 20, the process may return to rough detection (S1) or beam candidates narrow down (S2) as has been described above.

<Modification>

Figure 10:
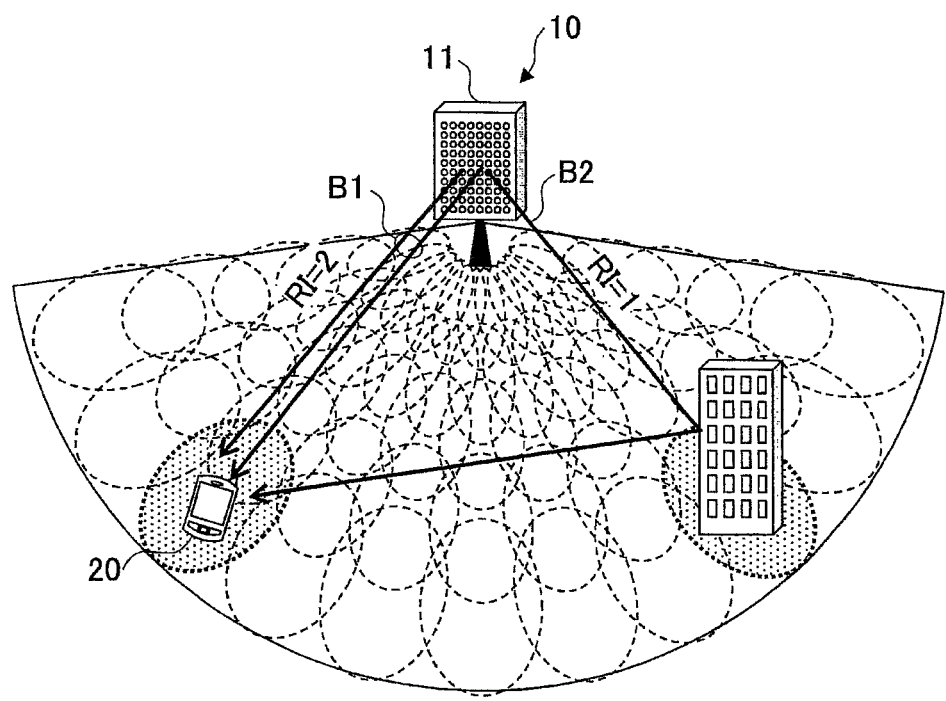
FIG. 10 illustrates a modification of beam selection.

FIG. 10 illustrates a modification of the embodiment. In a mobile communication system, the number of streams is generally switched using a rank indicator (RI) representing the number of transmission streams.

When performing beam selection using a scheme of the embodiment, the rank index can be grasped from the number of beams selected and accordingly, feedback of the rank indicator becomes unnecessary.

When the user equipment 20 transmits one or more beam indexes using a conventional RI region, other channel state information (CSI) such as CQI, precoding matrix indicator (PMI), etc., may be transmitted.

Rank adaptation may be performed for each beam index. For example, an RI may be transmitted for each beam index. When the user equipment 20 receives a direct beam B1 from the base station 10 and an indirect beam B2 reflected from a building, an RI may be transmitted on the beam-by-beam basis. It is generally known that channel correlation is low between orthogonally polarized waves. Depending on the antenna configuration, the number of streams may be set separately. With an orthogonally polarized antenna configuration, the number of streams may be fixed to two, and with a single polarization antenna configuration, the number of streams may be fixed to one. In this case, transmitting a rank index semi-statically for each beam index may be effective, rather dynamic RI transmission.

Particularly, it may be conceived to multiplex maximum two streams using polarizations at a single beam index. When in FIG. 10 beam B1 includes two orthogonal polarized streams, the user equipment 20 may transmit RI value "2" for beam B2 and RI value "1" for beam B1.

The number of streams may be switched adaptively between one and two. In this case, switching control can be performed by 1-bit information. For example, bit "0" may indicate a signal stream (the number of streams is one), and bit "1" may indicate two streams layered.

<Apparatus Structures>

Figure 11:
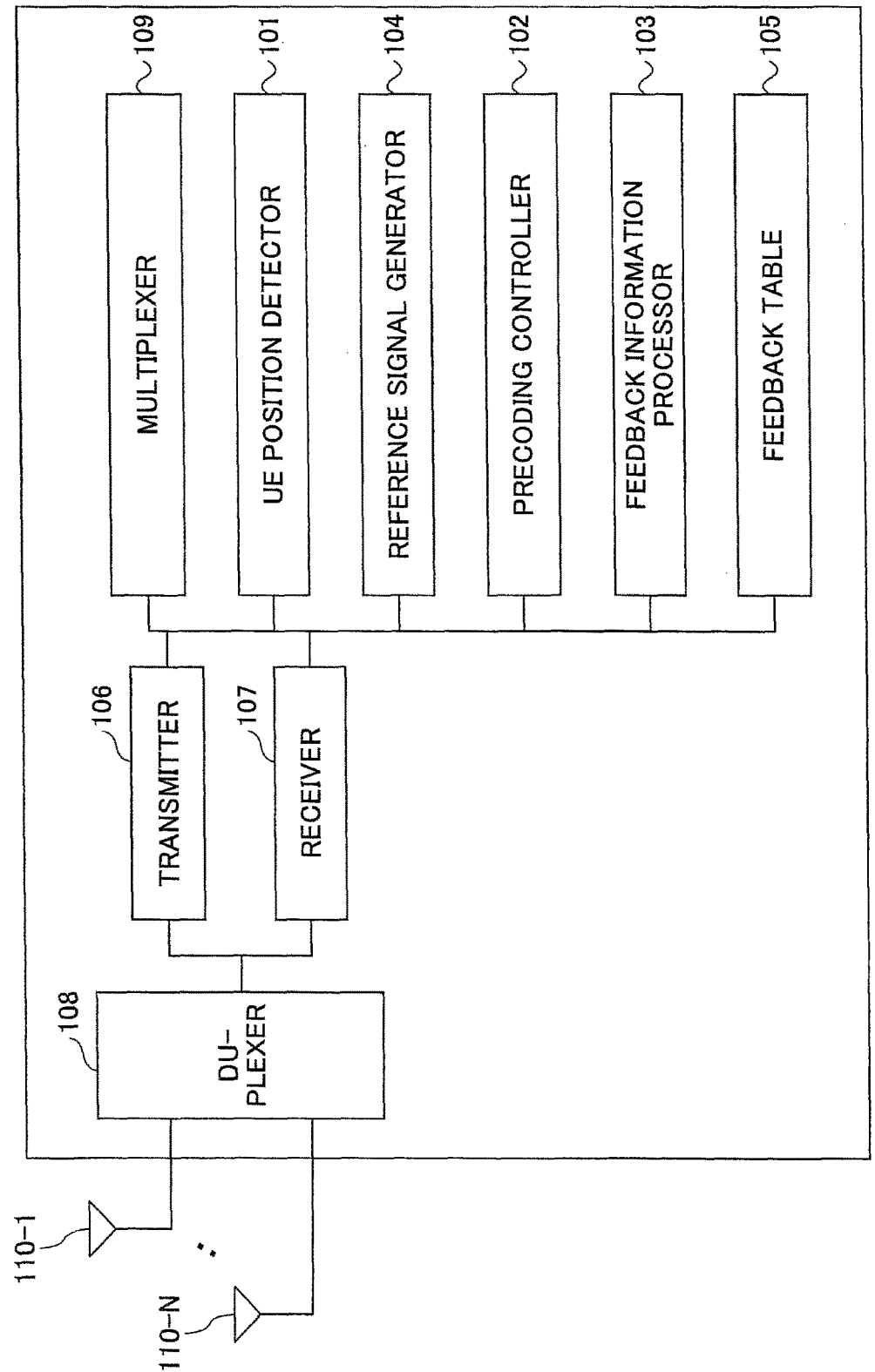
FIG. 11 is a schematic diagram of a base station used in an embodiment.

FIG. 11 is a schematic diagram of a base station 10 used in the embodiment. The base station 10 has multiple antennas 110-1 to 110-N, a transmitter 106, a receiver 107, and a duplexer 108 for switching between transmission and reception. The base station 10 roughly detects a location of the user equipment 20 at a UE position detector 101. A precoding controller 102 of the base station 10 determines weighing factors (phase rotation and/or amplitude) of a precoding vector for each of multiple reference signals such that the reference signals are transmitted toward adjacent directions at or around the detected location of the user equipment 20. A reference signal generator 104 of the base station 10 multiplies the precoding vector determined by the precoding controller 102 with each of the reference signals to generate multiple reference signals with directivities. The multiplication of precoding vectors and associated reference signals may be performed before mapping to subcarriers.

The multiple reference signals transmitted toward the user equipment 20 may be multiplexed at a multiplexer 109 along a time axis or a frequency axis, or undergo code-division multiplexing. The directional reference signals are transmitted toward the user equipment 20 from the antennas 110-1 to 110-N via the transmitter 106 and the duplexer 108. When polarized antennas are used, a beam specified by a single beam index may be transmitted over two orthogonal polarized waves (streams).

A feedback information processor 103 acquires feedback information from the user equipment 20 via the antennas 110-1 to 110-N, the duplexer 108 and the receiver 107 and processes the feedback information. The feedback information processor 103 identifies the beam index contained in the feedback information, referring to a feedback table 105. The feedback table 105 may be any one of the tables illustrated in FIG. 6 to FIG. 8.

The identified beam index is supplied to the precoding controller 102, together with the associated information (such as CQI, PMI, RI, etc.). The precoding controller 102 selects the optimum beam from the reported information and controls beam forming such that the data signal to the user equipment 20 is to be weighted by an appropriate precoding vector corresponding to the selected beam.

The precoding controller 102 may instruct the reference signal generator 104 to generate directional reference signals again, and/or instruct the UE position detector 101 to detect the location of the user equipment 20 again, when a specific value is contained in the feedback information.

The precoding controller 102 may determine precoding vectors to be multiplied with reference signals for multiple user equipments (UE1 and UE2, for example). In this case, the antennas 110-1 to 110-N transmit a reference signal for the first user equipment and a reference signal for the second user equipment by spatial multiplexing. It is preferable for the reference signals addressed to the first user equipment and the second user equipment to be orthogonal to each other. Upon receiving feedback information indicating satisfactory beam indexes from the first user equipment and the second user equipment, respectively, then the precoding controller 102 may determine the first and the second user equipments as a user pair with less interference.

The precoding controller 102 may determine two or more precoding vectors further narrowing the direction of the user equipment 20. In this case, the precoding controller 102 may instruct the reference signal generator 104 to generate reference signals with narrower and sharper directivities than the previously transmitted reference signals. The generated reference signals are transmitted from the antennas 110-1 to 110-N via the transmitter 106 and the duplexer 108.

Figure 12:
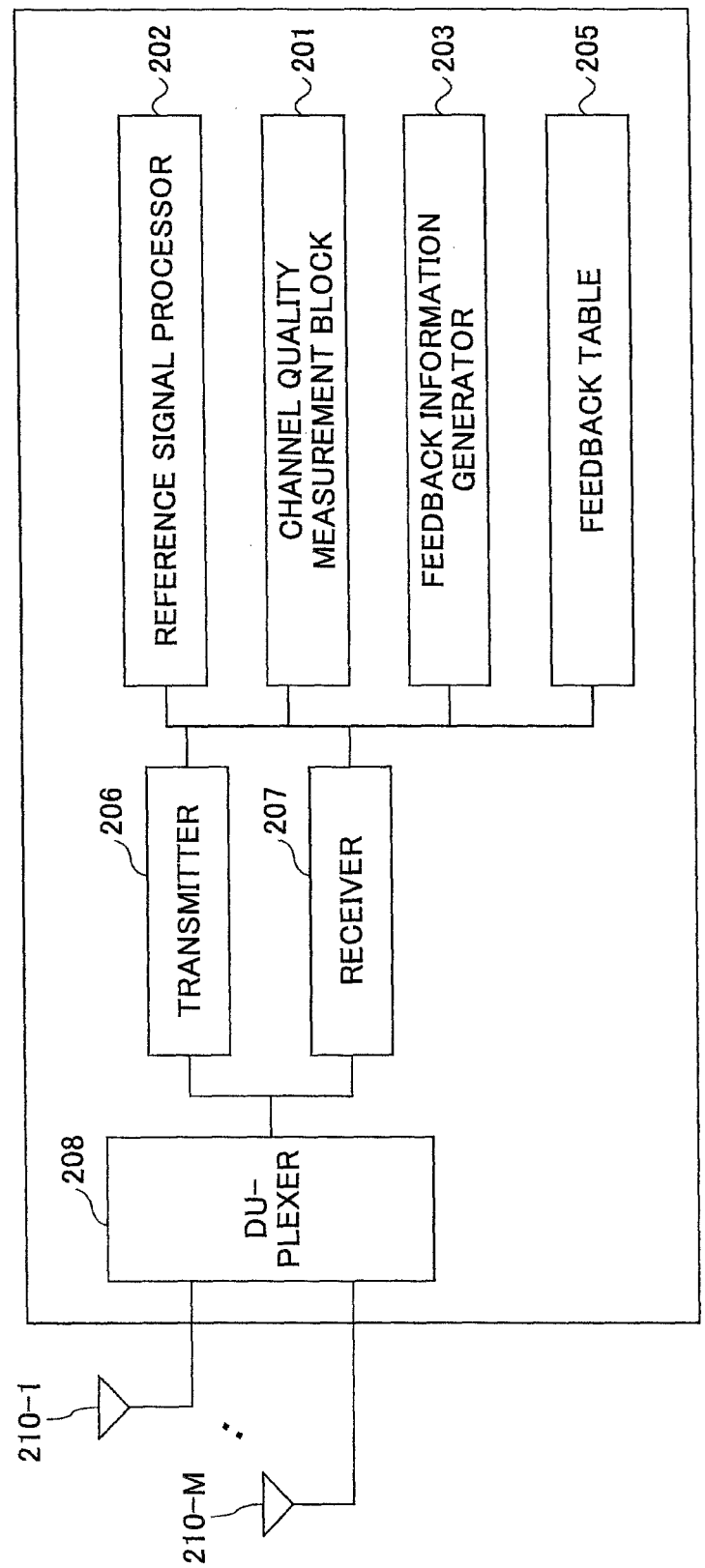
FIG. 12 is a schematic diagram of user equipment used in an embodiment.

FIG. 12 is a schematic diagram of a user equipment 20 used in the embodiment. The user equipment 20 has multiple antennas 210-1 to 210-M, a transmitter 206, a receiver 207, and a duplexer 208 for switching transmission and reception. Upon receiving reference signals from the base station, the user equipment 20 measures the quality of each of the reference signals at a channel quality measurement block 201.

Based upon the measurement results, a reference signal processing controller 202 of the user equipment 20 selects one or more appropriate beam indexes among multiple reference signals, referring to a feedback table 205. A feedback information generator 203 of the user equipment 20 generates feedback information that contains the selected beam indexes. The reference signal processing controller 202 may select a specific value, e.g., "000", from the feedback table 205 when there is no reference signal received with a quality beyond a predetermined level.

The reference signal processing controller 202 may determines a rank index based upon the channel quality measurement result and include the rank index in the feedback information. In place of reporting the rank index, two or more satisfactory reference signals may be selected and the corresponding beam indexes may be fed back to the base station 10.

The generated feedback information is transmitted from the antennas 210-1 to 210-M via the transmitter 206 and the duplexer 208.

By providing the base station 10 and the user equipment 20 with the above-described structures, efficient beam selection can be achieved, while preventing reference signal overhead from increasing.

This patent application is based upon and claims the benefit of the priority of the Japanese Patent Application No. 2014-059181 filed Mar. 20, 2014, which is incorporated herein by reference in its entirety.

What is claimed is:

1. A user equipment used in a mobile communication system, comprising:
   a plurality of antenna ports configured to receive a first reference signal type including more than one channel state information-reference signals (CSI-RSs) from a base station,
   wherein the plurality of antenna ports are configured to transmit a first feedback information for the first reference signal type, and
   wherein the plurality of antenna ports are configured to receive a second reference signal type from the base station and transmit a second feedback information for the second reference signal type,
   wherein the first feedback information includes a precode selection result for the first reference signal type and a number of optimum beams, and
   wherein the second feedback information includes a precode selection result for the second reference signal type.

* * * * *